(12) United States Patent
England et al.

(10) Patent No.: US 6,615,104 B2
(45) Date of Patent: Sep. 2, 2003

(54) SYSTEM AND METHOD OF SELECTING BOX SIZE

(75) Inventors: Tammy J. England, Duvall, WA (US); Walter C. Rector, Snoqualmie, WA (US)

(73) Assignee: Nintendo of America, Inc., Redmond, WA (US)

( * ) Notice: Subject to any disclaimer, the term of this patent is extended or adjusted under 35 U.S.C. 154(b) by 124 days.

(21) Appl. No.: 09/932,446

(22) Filed: Aug. 20, 2001

(65) Prior Publication Data

US 2002/0165639 A1 Nov. 7, 2002

Related U.S. Application Data

(60) Provisional application No. 60/287,407, filed on May 1, 2001.

(51) Int. Cl.[7] .................................................. G06F 7/00
(52) U.S. Cl. .............................. 700/213; 53/52; 53/201
(58) Field of Search .............................. 700/213; 53/52, 53/55, 56, 201

(56) References Cited

U.S. PATENT DOCUMENTS

| 3,705,410 | A | | 12/1972 | Kooy et al. |
| 4,010,595 | A | * | 3/1977 | Boyd ........................ 53/55 |
| 4,542,808 | A | | 9/1985 | Lloyd, Jr. et al. |
| 4,672,553 | A | | 6/1987 | Goldberg |
| 5,208,762 | A | | 5/1993 | Charhut et al. |
| 5,362,949 | A | * | 11/1994 | Gulick ...................... 235/385 |
| 5,395,206 | A | | 3/1995 | Cerny, Jr. |
| 5,430,831 | A | | 7/1995 | Snellen |
| 5,473,545 | A | | 12/1995 | Schausten |
| 5,493,491 | A | * | 2/1996 | Calcerano et al. ........... 705/28 |
| 5,501,571 | A | | 3/1996 | Van Durrett et al. |
| 5,631,827 | A | | 5/1997 | Nicholls et al. |
| 5,656,005 | A | | 8/1997 | Cummings et al. |
| 5,794,417 | A | * | 8/1998 | Mohrman ................... 53/541 |
| 5,875,434 | A | | 2/1999 | Matsuoka et al. |
| 5,936,863 | A | | 8/1999 | Kostelnik et al. |
| 5,999,920 | A | | 12/1999 | Sato et al. |
| 6,064,629 | A | * | 5/2000 | Stringer et al. ............. 367/128 |
| 6,141,647 | A | | 10/2000 | Meijer et al. |
| 6,170,231 | B1 | * | 1/2001 | Detterman .................. 53/208 |
| 6,186,724 | B1 | | 2/2001 | Hollander |
| 6,405,100 | B1 | * | 6/2002 | Christ ....................... 700/216 |
| 6,473,718 | B1 | * | 10/2002 | Bierschenk et al. ......... 702/155 |

FOREIGN PATENT DOCUMENTS

JP     03 138218     6/1991

* cited by examiner

*Primary Examiner*—Khoi H. Tran
(74) *Attorney, Agent, or Firm*—Nixon & Vanderhye P.C.

(57) ABSTRACT

A system and method of processing orders comprises receiving an order for at least one item, planning the order including enabling a computer system to select a container size for storing the at least one item, and overriding the container size selected by the computer system by manually determining and selecting a container having a size different than the container size selected by the computer system to store the at least one item. An override input indicating the container size of the manually determined and selected container is provided to the computer system. The computer system automatically selects a container size equal to the container size indicated in the override input during the planning of subsequent orders if the package size of items are equal to that of the first order.

30 Claims, 3 Drawing Sheets

SYSTEM AND METHOD OF SELECTING BOX SIZE

CROSS REFERENCE TO RELATED APPLICATION

This Application claims the benefit of U.S. Provisional Application No. 60/287,407 filed May 1, 2001, the contents of which are incorporated herein by reference.

BACKGROUND OF THE INVENTION

1. Field of the Invention

The present invention relates to a computerized system and method of processing an order for items, and in particular to a computerized system and method of selecting an appropriately sized box for shipment of ordered items.

2. Description of Prior Art

FIG. 2 illustrates a known computerized method of processing orders for individual item(s). After receiving the order from a customer (step 201), the order is planned (step 203). The planning of the order includes selecting a box size using a box size selection program for storing the ordered items for shipment. The selected box size must, for example, have a cubic volume at least as large as the collective volume of the individual items. The order is then waved (step 205) and the items picked from inventory (step 207). The items are placed in a box having a size selected by the box size selection program during the planning of the order (step 209). The box is then sealed and shipped to the customer (step 211).

The box size selected during the planning of the order may not, however, have a size that is the most appropriate for shipment. For example, it may be determined that the items picked from the inventory can be configured and stored within a box having a smaller size than the size selected during the planning of the order. This may occur, for example, because of the necessary over-estimates used in the box size calculations of the box size selection program. Also, a customer may impose specific preferences that a box having a certain size be used or avoided.

It would thus be beneficial to provide a computerized system and method of processing an order for items that are capable of automatically overriding a box size calculation that would otherwise normally be made during the planning of the order.

BRIEF SUMMARY OF THE INVENTION

In an exemplary embodiment of the present invention, a method of processing at least one order (and a system for performing the same) comprises: receiving an order for at least one item, planning the order including enabling a computer system to select a container size, and overriding the container size selected by the computer system by manually selecting a container having a size different than the container size selected by the computer system to store the at least one item. The manually selected container may have a size that is smaller than the container size selected by the computer system.

A container size override including a representation of the size of the manually selected container is input to the computer system. A second order is received and planned including enabling the computer system to select a container size based on the container size override. The computer system may select a container size during the planning of the second order that is equal to the container size represented in the container size override.

The method may further comprise receiving a second order for at least one item, and determining whether the second order is to be planned based on the container size override by comparing an item configuration of the second order to a model item configuration associated with the container size override. Specifically, the second order is planned based on the container size override if the item configuration of the second order matches the model item configuration associated with the container size override.

In another embodiment of the invention, a method of processing an order (and system for performing the same) comprises receiving an order for at least one item, determining whether a predetermined container size override, the predetermined container size override being associated with a model item configuration, is applicable to the order, and planning the order including enabling a computer system to select a container size based upon the determination of whether the container size override is applicable to the order.

The computer system selects a container size identified by the container size override if it is determined that the container size override is applicable to the order. Determining whether the container size override is applicable to the order includes comparing an item configuration of the order to the model item configuration associated with the predetermined container size override. Specifically, the container size override is applicable to the order if the model item configuration associated with the container size override matches an item configuration of the order. The computer system selects a container size by executing a program for calculating the container size if it is determined that the container size override is not applicable to the order.

The container size override is determined by manually determining a container size for the model configuration associated with the container size override. The container size override is input into the computer system if it is manually determined that a container having a size that is different than the one selected by the computer system is to be used. The container size override input into the computer system includes a representation of the size of the container to be used.

BRIEF DESCRIPTION OF THE DRAWINGS

The above advantages, as well as other advantages of the invention, will be more completely understood and appreciated by careful study of the following more detailed description of the invention taken in conjunction with the accompanying drawings, in which.

DETAILED DESCRIPTION OF THE INVENTION

Figure 1:
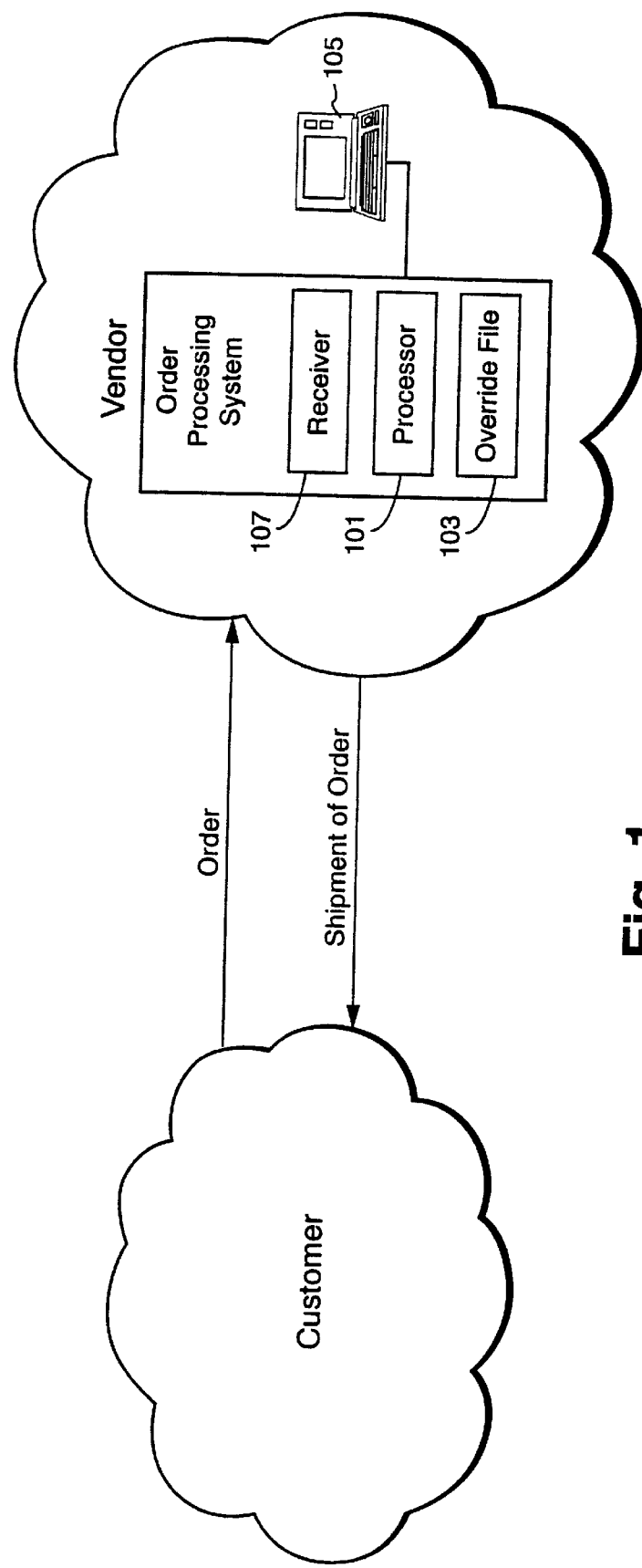
FIG. 1 is a block diagram of an order processing system in accordance with an exemplary embodiment of the present invention.
Figure 2:
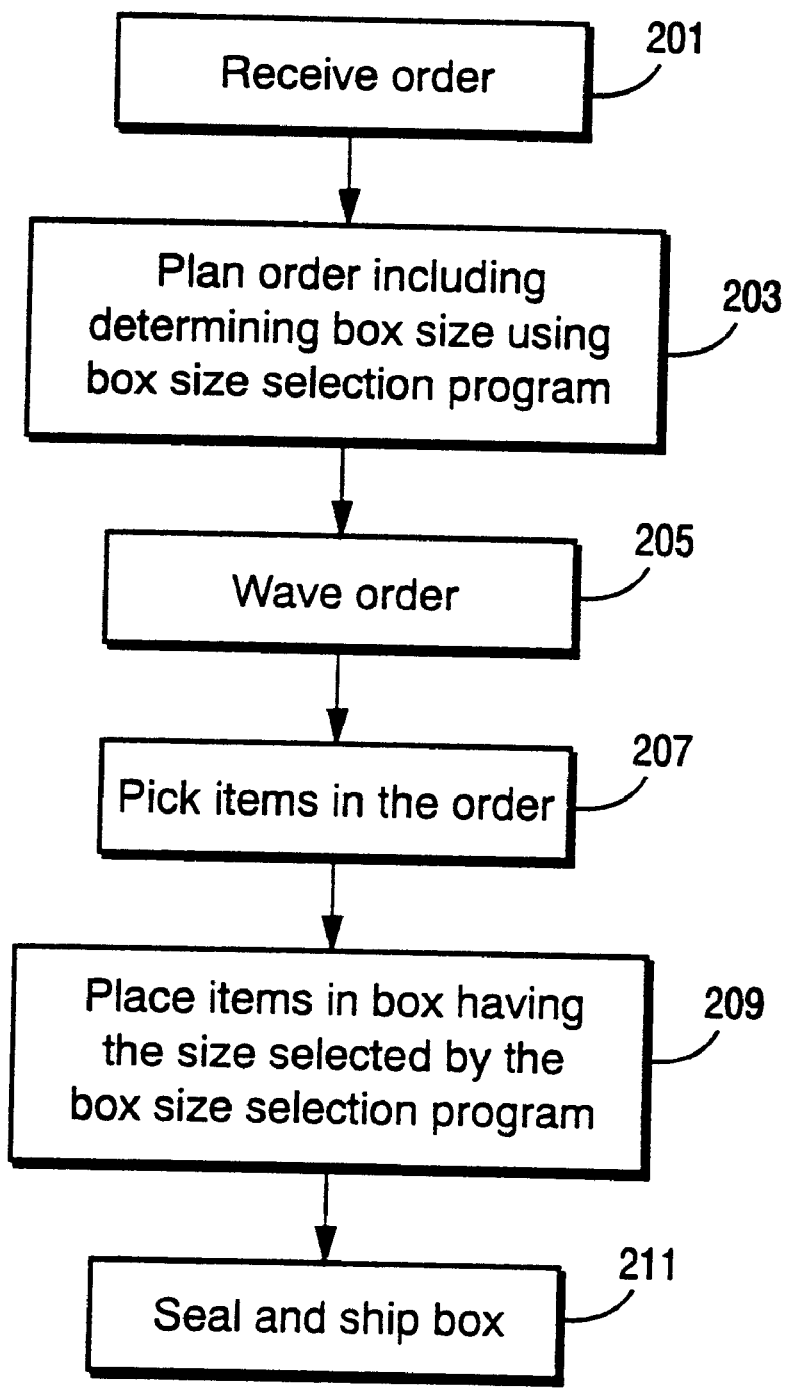
FIG. 2 is a flow chart illustrating a prior art method of processing orders.

FIG. 1 illustrates a computerized system for processing orders in accordance with an exemplary embodiment of the present invention. The system for processing orders includes, inter alia, a receiver 107, a processor 101 and an "override file" 103 for storing data to override a box size calculation and selection that would otherwise be performed by the processor 101. At least one computer terminal 105 communicates with the system for providing input to and displaying output from the system.

A vendor implementing the system is capable of receiving orders from customers through the receiver 107. An order may be received by receiver 107, for example, through directly wired or wireless data transmission or manual data entry by vendor personnel. Each order indicates at least one individual item which the customer desires from the vendor. Each item in the vendor's inventory will typically includes its own individual package that contains the item. For purposes of the discussion below, the package containing the item is considered part by of the ordered item itself. Some of the items in the vendor's inventory will typically be the same size (i.e., volume), even if the items themselves are different types of products.

Figure 3:
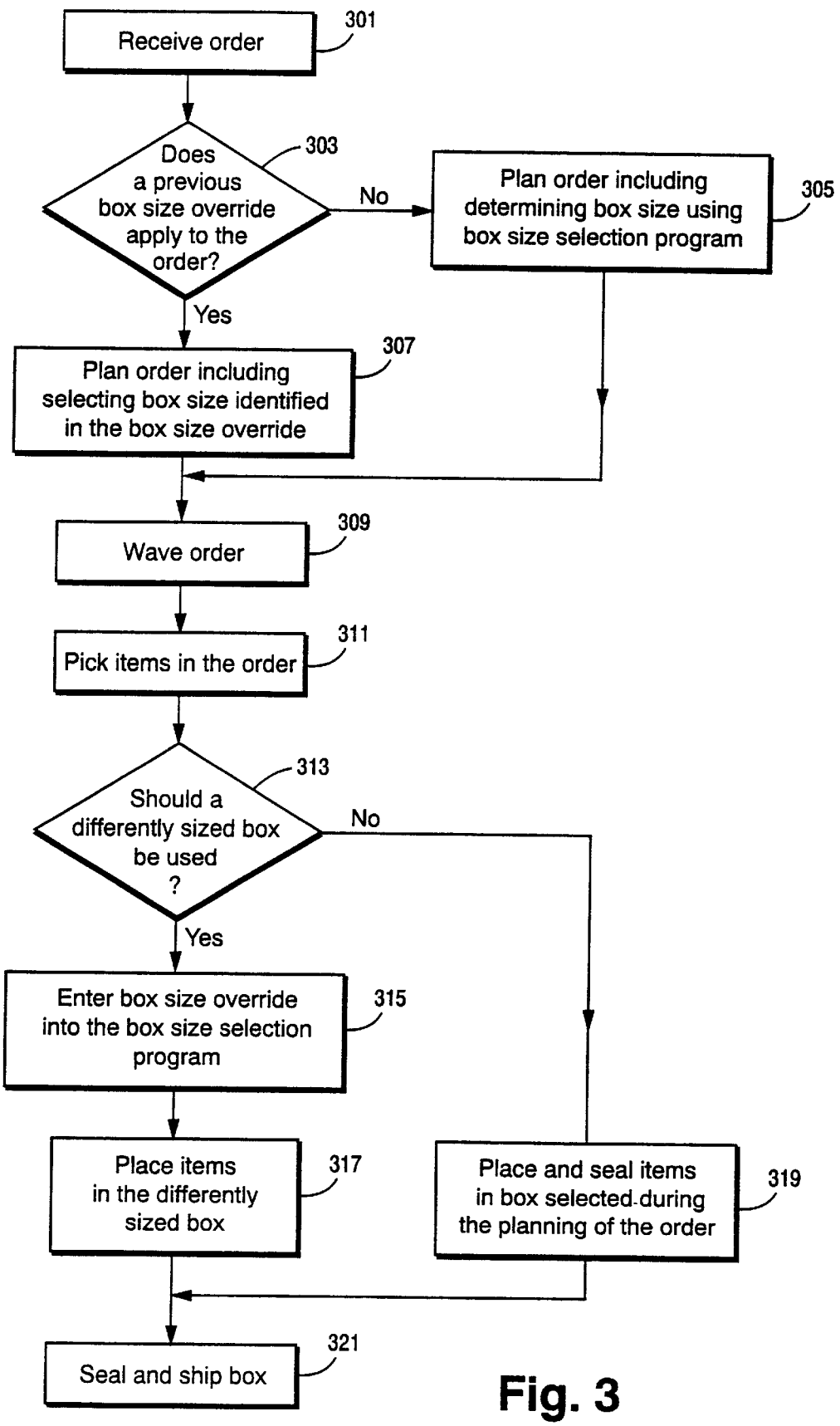
FIG. 3 is a flow chart illustrating a method of processing orders in accordance with an exemplary embodiment of the present invention.

As illustrated in FIGS. 1 and 3, after the system receives an order from a customer through the receiver 107 (step 301), the order is provided to the processor 101. The processor 101 evaluates a physical item configuration of the ordered items using the number and sizes of the ordered items. A determination is made whether any of a plurality of box size overrides that have been previously entered in the system (as will be discussed in more detail below in conjunction with steps 313–317) is applicable to the item configuration of the ordered items (step 303).

Specifically, each of the previously entered box size overrides are stored in the override file 103. Each box size override is associated with a model item configuration and identifies a box size that has been manually determined by the vendor's personnel to be the most appropriate size to ship an order of the items forming the model item configuration. For example, suppose the order processing system received a previous order for ten Product M items and planned an order for the ten Product M items by calculating and selecting a box having a volume of two cubic feet. Further suppose that the vendor's personnel manually discovered that a smaller box having a volume of only one cubic foot could be used to more appropriately store the ten Product M items for shipment. The vendor's personnel would enter a box size override into the system (as will be further discussed below in conjunction with steps 313–317) which reflects the item configuration of ten Product M items and the more appropriate box size of one cubic foot. The box size override will be stored in the override file 103 and provide a model item configuration of ten Product M items for comparison to all item configurations of subsequently received and planned orders.

If the item configuration of the order being currently processed matches the model item configuration associated with the box size override, the box size override will be deemed to be applicable to the order and thus the box size will be determined by the box size override. In the foregoing example, if the current order is for ten Product M items, then the processor 101 will determine that the item configuration of ten Product M items matches the model item configuration of ten Product M items associated with the box size override. The processor 101 will thus select a box size of one cubic foot as defined by the applicable box size override rather than executing a box size selection program which would have calculated a box size of two cubic feet.

The item configuration is based upon the size and number of the items, not their respective types. If, for example, the order being currently processed is for ten Product N items (i.e., a Product N item is a different type of item than a Product M item), then the item configuration of the current order would match the model item configuration of ten M items associated with the box size override as long as a Product N item is the same size as a Product M item. The box size selected for the ten Product N items would therefore be one cubic foot as defined by the box size override associated with the model item configuration of ten Product M items even though a Product N item is a different type of product than a Product M item. The box size selection program would not be executed to calculate box size.

If any of the previously entered and stored box size overrides is applicable to the item configuration of the order, data indicating a box size for storing the ordered items for shipment will be read by the processor 101 from the override file 103 so that the box size is selected as defined by the applicable override. The order will be planned using the box size identified by the box size override (step 307). If none of the previously entered and stored box size overrides is applicable to the item configuration of the order, the processor will execute a box selection program to calculate a box size for storing the ordered items for shipment. The order will be planned using that calculated box size (step 305).

The order processing system then waves the order (step 309) and the ordered items are picked from the vendor's inventory (step 311). After evaluating the placement of the picked items into a box having the size selected during the planning of the order (step 305 or 307), it may be manually determined by the vendor's personnel that a differently sized box should be used for storing the picked items for shipment (step 313). For example, it may be determined by the vendor's personnel that a box have a smaller (or larger) size than the size selected during the planning of the order can be used. Using a smaller box size will save space on the carrier transporting the box to the customer and reduce the need for any necessary packing material within the box. As a further example, a differently sized box may be chosen due to the customer's preference or requirement that a box having a certain box size be used or avoided.

If it is determined that a differently sized box should be used for storing the picked items for shipment (step 313), the vendor's personnel will enter a box size override into a terminal 105 (step 315). Specifically, the vendor's personnel will provide input reflecting (i) the manually selected box size and (ii) an order number associated with, inter alia, the item configuration and a customer account number into a menu displayed on the terminal 105 from the system. The box size override entered by the vendor's personnel will be stored in the override file 103 and will be available for any order that has not yet been received or planned. That is, the model item configuration of the newly entered box size override will be available for comparison to the item configurations of subsequent orders when the subsequent orders are evaluated in step 303 as discussed above. If the box size override is thus determined by the system to apply to a subsequent order, the system will not attempt to execute the box selection program (step 305 will not be executed). The selected box size will be defined by the box size identified by the box size override.

The picked items are placed in the differently sized box that is manually determined by the vendor's personnel (step 317). The box is then sealed and shipped (step 319).

As discussed above, the box size override is based on the size of the items, not the specific type of items. For example, suppose the package size for a Product X item is the same as the package size for a Product Y item, and that a box size override has been entered into the system having a model item configuration for two Product X items. If an order for two Product Y items was subsequently received, the system would determine that a box size override applies to this item configuration ("yes" in step 303) even though the Product X item is not the same type of product as the Product Y item. In this case, the item configuration of the order (two Product Y items) matches the model item configuration of the box size override (two Product X items). The box size selected for the order of two Product Y items is thus chosen to be equal to the box size that was previously used to ship the two Product X items as defined by the box size override. Calculations by the box size selection program are not needed since the box size will be defined by the box size override.

If it is determined that a differently sized box should not be used to ship the picked items ("no" in step 313), the picked items are placed into a box having the size selected during the planning of the order (size selected in step 305 or 307). The box is then sealed and shipped to the customer (step 321).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while the above detailed description discusses processing orders by, inter alia, selecting a "box" size, it will be understood that orders may be processed by selecting any "container" of any shape or material capable of storing an item(s).

What is claimed is:

1. A method of processing at least one order comprising:
   receiving an order for at least one item;
   planning the order including enabling a computer system to select a container size; and
   overriding the container size selected by the computer system by manually selecting a container having a size different than the container size selected by the computer system to store the at least one item.

2. The method of claim 1 further comprising inputting a container size override into the computer system, the container size override including a representation of the size of the manually selected container.

3. The method of claim 2 further comprising receiving and planning a second order including enabling the computer system to select a container size based on the container size override.

4. The method of claim 3 wherein the computer system selects a container size during the planning of the second order that is equal to the container size represented in the container size override.

5. The method of claim 2 further comprising receiving a second order for at least one item, and determining whether the second order is to be planned based on the container size override by comparing an item configuration of the second order to a model item configuration associated with the container size override.

6. The method of claim 5 wherein the second order is planned based on the container size override if the item configuration of the second order matches the model item configuration associated with the container size override.

7. The method of claim 1 wherein the container that is manually selected has a size that is smaller than the container size selected by the computer system.

8. A method of processing an order comprising:
   receiving an order for at least one item;
   determining whether a predetermined container size override, the predetermined container size override being associated with a model item configuration, is applicable to the order; and
   planning the order including enabling a computer system to select a container size based upon the determination of whether the container size override is applicable to the order.

9. The method of claim 8 wherein the computer system selects a container size identified by the container size override if it is determined that the container size override is applicable to the order.

10. The method of claim 8 wherein determining whether the predetermined container size override is applicable to the order includes comparing an item configuration of the order to the model item configuration associated with the predetermined container size override.

11. The method of claim 10 wherein the container size override is applicable to the order if the model item configuration associated with the container size override matches an item configuration of the order.

12. The method of claim 8 wherein the computer system selects a container size by executing a program for calculating the container size if it is determined that the container size override is not applicable to the order.

13. The method of claim 8 wherein determining the container size override comprises manually determining a container size for the model item configuration associated with the container size override.

14. The method of claim 8 wherein the container size override is input into the computer system if it is manually determined that a container having a size that is different than a size selected by the computer system is to be used to store an ordered item(s).

15. The method of claim 14 wherein the container size override input into the computer system includes a representation of the size of the container to be used to store the ordered item(s).

16. A system for processing at least one order comprising:
   a receiver for receiving an order for at least one item; and
   a processor for planning the order including selecting a container size, the processor being operatively coupled to the receiver;
   wherein the container size selected by the processor is overridden by manually selecting a container having a size different than the container size selected by the processor to store the at least one item.

17. The system for claim 16 wherein the processor receives a container size override which includes a representation of the size of the manually selected container.

18. The system for claim 17 wherein the receiver receives a second order and the processor plans the second order including enabling the computer system to select a container size based on the container size override.

19. The system for claim 18 wherein the processor selects a container size during the planning of the second order that is equal to the container size represented in the container size override.

20. The system for claim 17 wherein the receiver receives a second order for at least one item, and the processor determines whether the second order is to be planned based on the container size override by comparing an item configuration of the second order to a model item configuration associated with the container size override.

21. The system for claim 20 wherein the processor plans the second order based on the container size override if the item configuration of the second order matches the model item configuration associated with the container size override.

22. The system for claim 16 wherein the container that is manually selected has a size that is smaller than the container size selected by the computer system.

23. A system for processing an order comprising:

a receiver for receiving an order for at least one item; and a processor operatively coupled to the receiver for determining whether a predetermined container size override, the container size override being associated with a model item configuration, is applicable to the order, and for planning the order including selecting a container size based upon the determination of whether the container size override is applicable to the order.

24. The system for claim 23 wherein the processor selects a container size identified by the container size override if it is determined that the container size override is applicable to the order.

25. The system for claim 23 wherein the processor determines whether the predetermined container size override is applicable to the order by comparing an item configuration of the order to the model item configuration associated with predetermined container size override.

26. The system for claim 25 wherein the container size override is applicable to the order if the model item configuration associated with the container size override matches an item configuration of the order.

27. The system for claim 23 wherein the processor selects a container size by executing a program for calculating the container size if it is determined that the container size override is not applicable to the order.

28. The system for claim 23 wherein determining the container size override comprises manually determining a container size for the model item configuration.

29. The system for claim 23 wherein the processor receives the container size override if it is manually determined that a container having a size that is different than a size selected by the computer system is to be used to store an ordered item(s).

30. The system for claim 29 wherein the container size override input into the computer system includes a representation of the size of the container to be used to store the ordered item(s).

* * * * *